UNITED STATES PATENT OFFICE.

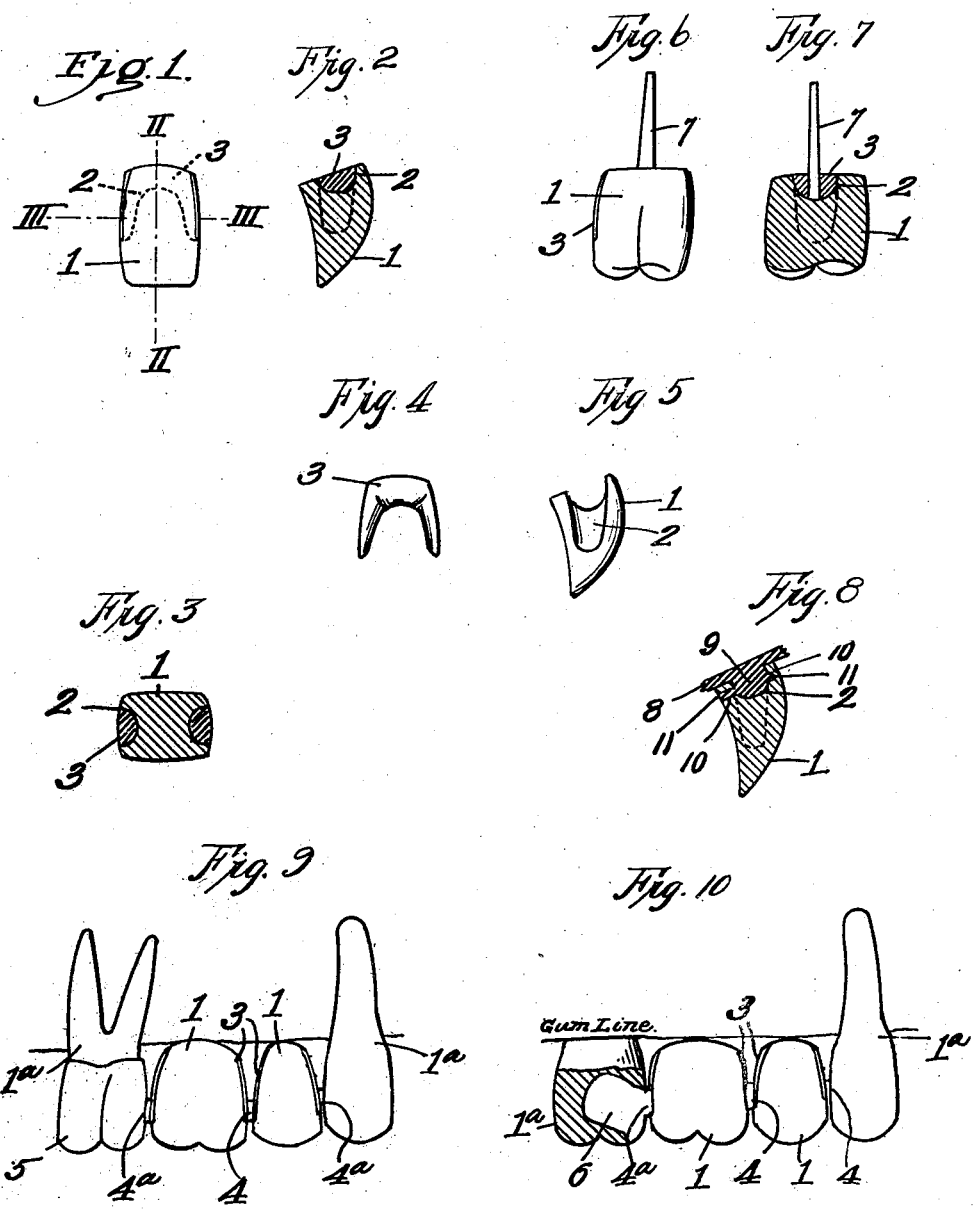

HOWARD S. LOWRY, OF KANSAS CITY, MISSOURI.

ALL-PORCELAIN TOOTH.

1,377,358.

Specification of Letters Patent.   Patented May 10, 1921.

Application filed May 19, 1920.   Serial No. 382,513.

*To all whom it may concern:*

Be it known that I, HOWARD S. LOWRY, a citizen of the United States, and resident of Kansas City, in the county of Jackson and State of Missouri, have invented a certain new and useful Improvement in All-Porcelain Teeth, of which the following is a complete specification.

This invention relates to artificial teeth of that class usually denominated all-porcelain teeth, and used commonly in platework or secured in place by pins anchored in natural tooth roots, and my object is to produce a tooth of this character provided with a reinforcement which increases the strength of the tooth as contrasted with a tooth baked to the customary anchoring pin, which actually weakens the tooth. A further object is to produce an all-porcelain tooth which can be used in bridgework and also in such work, serve as an abutment or support for a juxtaposed tooth or a pair of juxtaposed teeth.

With these general objects in view and others as hereinafter appear the invention consists in certain novel and useful features of construction and combinations of parts as hereinafter described and claimed; and in order that it may be fully understood reference is to be had to the accompanying drawing, in which:

Figure 1 is a front elevation of a tooth provided with a reinforcement embodying the invention.

Fig. 2 is a vertical section taken on the line II—II of Fig. 1.

Fig. 3 is a horizontal section taken on the line III—III of Fig. 1.

Fig. 4 is a detail view of the reinforcement.

Fig. 5 is a detail view of an all-porcelain or equivalent material for use in conjunction with the reinforcement shown by Fig. 4, Fig. 5 representing a view taken at right angles to that shown by Fig. 4.

Fig. 6 is an elevation of a tooth embodying the invention, but shown as equipped also with a pin for anchorage in a root of a natural tooth.

Fig. 7 is a central vertical section of the construction shown by Fig. 6.

Fig. 8 is a vertical section similar to Fig. 2, but showing a porcelain tooth prepared for use in a rubber plate.

Fig. 9 is an elevation of a series of teeth including a pair of all-porcelain teeth, and disclosing how the same may be employed in bridgework where the ends of the bridge are fastened to two natural teeth.

Fig. 10 is a similar view but showing where one end of the bridge is fastened to an inlay of a natural tooth.

Referring to the drawing in detail, 1 indicates a tooth made of porcelain or the like, and provided in its base, *i. e.*, its upper or lower end, accordingly as it is used in the lower or upper jaw, with U-shaped groove 2, the arms of the groove being in the side faces of the tooth and the connecting portion of the groove extending across the tooth in a direction generally parallel to the labial or buccal face thereof. A U-shaped reinforcement 3, of gold or the like, accurately fits this groove and is cemented therein, the external surface of the reinforcement being flush with the exterior surface of the tooth. This reinforcement increases the strength of the tooth because the material employed is of greater strength than the porcelain and guards against fracture of the latter because its arms extend along the sides of the tooth for the greater part of the length of the same without being embedded into the porcelain a sufficient depth to weaken the intervening portion thereof, that is, the portion lying between the arms of the reinforcement, as is true where the customary pin is employed for anchoring a porcelain tooth to a natural tooth root, if the porcelain tooth is of the incisor or canine type where the embedded end of the pin comes close to the surface of the tooth and leaves but little of the latter to resist fracture under the imposition of strains imposed through biting hard objects. It will be apparent that a reinforcement of the character mentioned possesses the advantage over the pin anchorage type mentioned in that it actually increases the strength of the porcelain tooth instead of diminishing such strength. It also has the advantage of being capable of use in bridgework.

By reference to Fig. 9 it will be seen that two porcelain teeth 1—1 are arranged side by side between two natural teeth 1ª—1ª, and that the adjacent side arms of the reinforcements of the said porcelain teeth are united at 4 by gold or equivalent metal fitted between and soldered to said arms, the connection 4 being disposed at the lower extremities of said arms so as to leave the space above clear for the passage of wash water, tooth paste and the like, i. e., for sanitary reasons. By reference to the same figure, it will be seen that one of the porcelain teeth is soldered as at 4ª to a gold crown 5 secured upon natural tooth 1ª. At the other extremity of the bridge, the adjacent natural tooth may be provided with what is known as a three-fourths crown on its lingual face (not shown), and to adjacent artificial tooth, or rather the adjacent arm of the reinforcement thereof, is soldered as explained. It will be apparent that a bridge of this character possesses great strength and that where more than two porcelain teeth constitute a part of the bridge, they form abutment supports for each other, which is impossible with the pin-anchored type of porcelain teeth.

A porcelain tooth or porcelain teeth equipped with a reinforcement of the character described, may be anchored to adjacent teeth in various other ways. For example, in Fig. 10, the reinforcement of one of the porcelain teeth is soldered to a solid inlay 6 of a natural tooth, instead of to a crown thereon as shown in Fig. 9. It will be obvious that a tooth provided with such reinforcement may be anchored in the manner explained through other means of support not necessary to identify herein but familiar to those skilled in the art of dentistry.

The method of producing the reinforcement and the groove in the porcelain tooth for the reception of the reinforcement, does not affect the character of the product and therefore need not be explained herein. It is desirable to state that where an individual porcelain tooth is to be placed in position against a solid root of a natural tooth, the reinforcement of the porcelain tooth may be provided with a pin 7 to be cemented in such root, the pin to be cast or otherwise rigidly secured to the central portion of the reinforcement instead of being baked directly into the porcelain tooth itself, and it will be obvious that a tooth thus reinforced and secured to a root by a pin arranged as explained, will possess greater strength than where the reinforcement of this application, is lacking and the pin is embedded in and backed on the tooth itself.

An artificial tooth of the type described can be used to great advantage in plate work as the embedment of an integral part of the plate in the groove 2 of the tooth increases the strength of the latter and unites it more firmly to the plate. In Fig. 8, the plate 8, shown in fragmentary form, is cast or molded onto the tooth 1, and into the groove 2 of the latter as at 9. If desired the connection can be made more secure by providing the tooth with alined holes 10 communicating with the said groove so that the rubber or equivalent plate material shall, in the molding or casting operation, run into the said holes and form pins 11, for firmly anchoring the tooth to the plate.

From the above description it will be apparent that I have produced an all-porcelain tooth embodying the features of the invention, and which is susceptible of modification in minor particulars without departing from the principle of construction involved or sacrificing any of the advantages of the appended claims.

I claim:

1. The combination in bridgework of a series of adjacent artificial teeth provided with metal reinforcements embedded rigidly in and extending across the bases of the teeth and along the sides thereof, and means uniting the juxtaposed portions of the reinforcements of adjacent teeth.

2. An artificial tooth provided in its base with a substantially U-shaped groove, and a reinforcement secured in said groove of greater strength than the material of the tooth and having an affinity for solder, and an anchoring pin extending to the direction of the length of the tooth and secured at one end to said metal reinforcement.

3. An artificial tooth provided across its base and in its sides with grooves and with alined holes intersecting the groove in its base.

4. The combination with an artificial tooth having a groove across its base and grooves in its sides communicating with the groove in the base and with alined holes intersecting the groove in the base, of a plate cast into said grooves and said holes.

In testimony whereof I hereunto affix my signature.

HOWARD S. LOWRY.